2,077,969

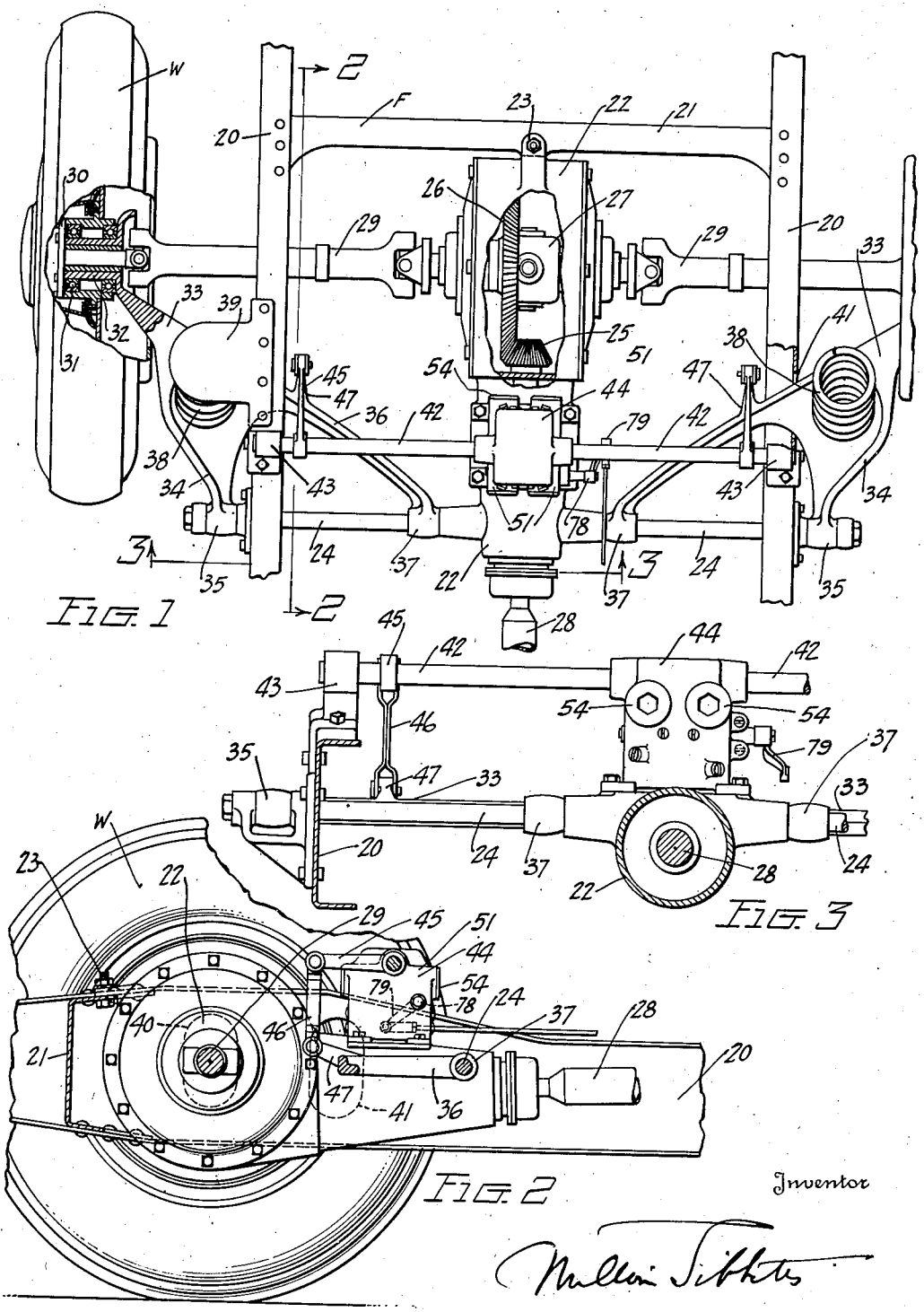
April 20, 1937.   M. TIBBETTS   2,077,969
MOTOR VEHICLE
Filed Feb. 17, 1934   2 Sheets-Sheet 1
Inventor
Millen Tibbetts April 20, 1937.    M. TIBBETTS    2,077,969
MOTOR VEHICLE
Filed Feb. 17, 1934    2 Sheets-Sheet 2
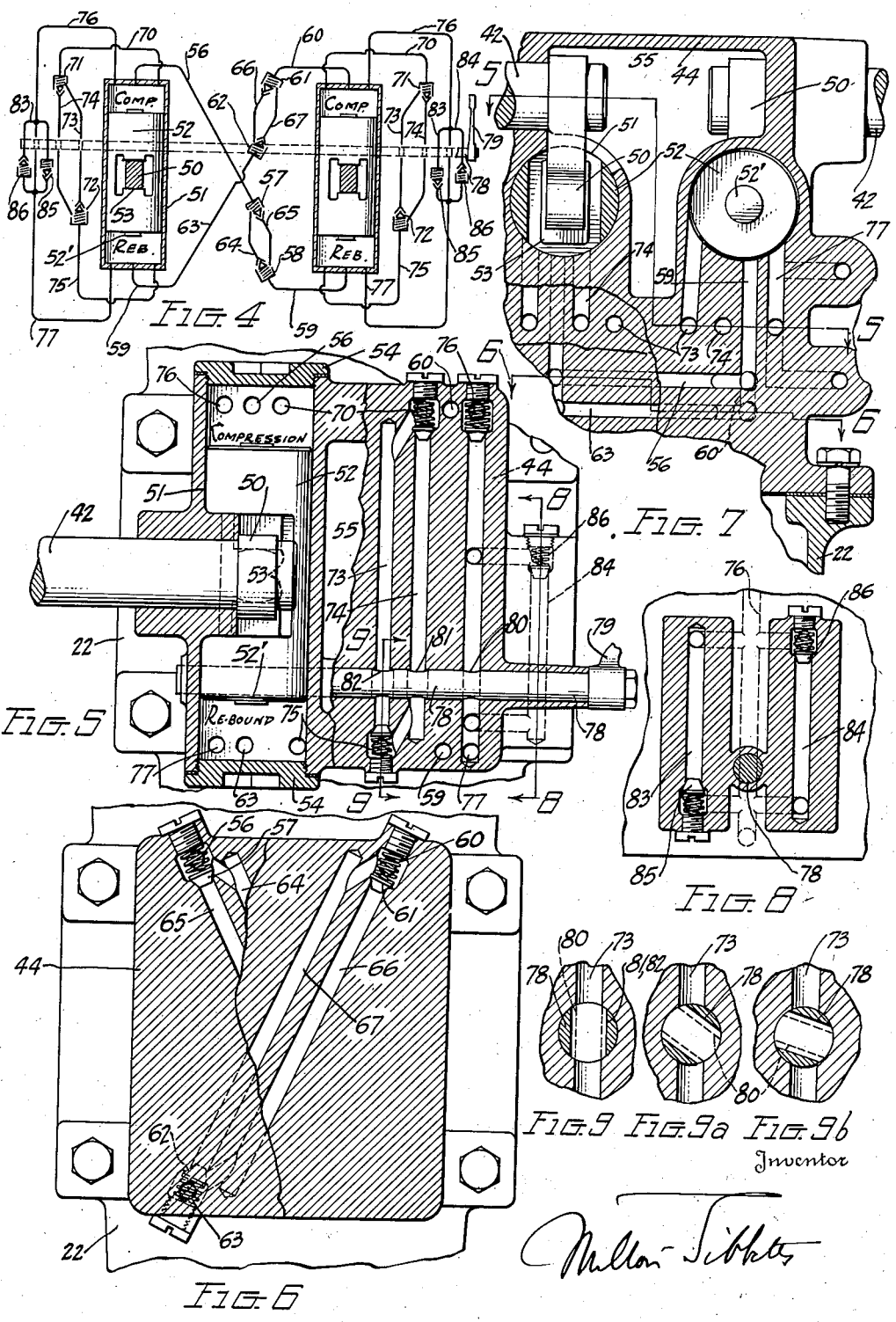
Inventor
Milton Tibbetts Patented Apr. 20, 1937

UNITED STATES PATENT OFFICE 2,077,969

MOTOR VEHICLE

Milton Tibbetts, Detroit, Mich., assignor to Packard Motor Car Company, Detroit, Mich., a corporation of Michigan Application February 17, 1934, Serial No. 711,663

20 Claims. (Cl. 267—11)

This invention relates to motor vehicles and particularly to the suspension and shock absorber means of motor vehicles.

Motor vehicles have been provided with various forms of connections between the wheels and frame. In some cases the wheel carriers are in the form of axles extending across the vehicle with a wheel mounted at either end, and in other cases the wheels are independently mounted, that is, on wheel carriers which are independently connected to the frame. Various forms of springs are used between the wheel carriers and the frame, the more conventional being the leaf spring, but more recently the coil spring has come into use.

The present invention is shown as applied to the driving end of the vehicle and the wheels are independently supported on carriers pivoted on the frame and with coil springs between the carriers and the frame. The driving gears are mounted on the frame at the middle thereof and universally jointed shafts extend laterally to the wheels.

In all of the usual forms of wheel mountings for motor vehicles there is likely to be more or less side roll or tendency for one side of the frame to drop down and the other to rise, as the vehicle takes a turn at speed, and thus the axes of the wheels or wheel bearings of the wheel carriers, in those instances, will not retain their parallel relation with the frame. Various devices have been designed to prevent this side roll or tendency to get out of parallelism. In some cases cross shafts are provided and interconnected with the wheel carriers so that if one wheel moves upwardly the other wheel will have to move upwardly also, and vice versa. These are found to be harsh and to interfere considerably with the ride of the vehicle, and there is no particularly good way of controlling their action.

The conventional hydraulic shock absorbers mounted at the sides of the vehicle have been interconnected with piping, for the same purpose, and here additional difficulties have arisen, particularly the difficulty of preventing leakage in the long pipes and the difficulty of keeping air out of the hydraulic system. The pipe connections must of necessity be more or less flexible and these flexible connections have given trouble where used, both by leaking and by breaking.

One of the objects of the present invention is to provide a motor vehicle with wheel suspension and anti-roll means such that the desirable features of the anti-roll means may be retained and the undesirable features thereof eliminated. Other desirable results follow from the construction designed to attain this object, and this object and these results will be more particularly brought out in the following description.

Other objects and advantages will also appear from the following description.

In the drawings, which form a part of this specification:

Fig. 1 is a plan view of the driving portion of a motor vehicle chassis, with parts cut away to more clearly show the construction;

Fig. 2 is a section substantially on the line 2—2 of Fig. 1;

Fig. 3 is a vertical cross section along the line 3—3 of Fig. 1;

Fig. 4 is a diagrammatic view of the shock absorber means;

Fig. 5 is a section through the shock absorber casing on the line 5—5 of Fig. 7;

Fig. 6 is a section on the line 6—6 of Fig. 7;

Fig. 7 is a sectional view through the shock absorber casing and showing a fragment of the gear casing upon which it is mounted;

Fig. 8 is a detail section on the line 8—8 of Fig. 5, and

Figs. 9, 9a and 9b are sections on the line 9—9 of Fig. 5, showing the control valve in several different positions.

In Fig. 1 the frame part of the vehicle is indicated at F and one of the wheels is indicated at W. Only a fragment of a wheel is shown on the opposite side of the vehicle. The frame has side members 20 and a cross member 21 and there is a casing 22 supported in part upon the cross member 21 as at 23 and in part upon a cross bar 24. This casing contains the driving gears 25 and 26 of the differential gearing 27, and the driving shaft 28 extends into the casing and is connected with the gear 25. Universally jointed shafts 29 extend laterally from the differential to the driving wheels W, the connection to one of the driving wheels being shown at 30.

Each of the wheels is mounted on suitable bearings 31 on a hollow spindle 32, the shaft 29 extending through the spindle to the connection 30. The spindle 32 is at the free end of a wheel carrier or support 33 which may be in the form of a yoke as shown, having an arm 34 pivoted to a projecting end of the bar 24 as at 35, and an arm 36 pivoted on the bar 24 as at 37. A heavy coil spring 38 is arranged between the wheel carrier 33 and a bracket 39 on the frame side member 20. Thus the wheel carrier, and consequently the wheel, yieldingly supports the frame of the vehicle so that there may be relative movement between the wheels and the frame to take care of unevennesses in the road. As shown in the drawings, the side member 20 of the frame is formed with two vertically elongated openings 40 and 41 through which pass respectively the shafts 29 and the arm 36.

From the above description it will be seen that if the wheel carriers 33 move upwardly towards the frame to substantially the same extent then the carriers may be said to retain substantial parallelism with the frame, but if one moves upwardly more than the other, or if the frame tends to roll relatively to the wheel axes, then a non-parallelism is established. Under some but not all conditions it is desirable that these relatively moving parts should retain their substantial parallelism and in this invention the control thereof is placed in the hands of the driver of the vehicle or in some automatic device connected to that control.

For the purpose of cross connecting the wheel carriers so that they may be caused to move substantially together there is provided a two-part cross shaft 42, the outer ends of which are mounted in suitable bearings 43 in the side members 20 of the frame. The two parts of this shaft 42 are arranged end to end and their adjacent ends extend into a casing 44 which is a shock absorber casing in which is the hydraulic means for interconnecting those shaft parts. Adjacent the outer ends of the shaft parts are arms 45 which are provided with links 46 connecting them with the wheel carriers as at the bracket 47 thereon. Thus if the adjacent ends of the shaft parts were connected together this shaft would act as a torsion rod to cause the two wheel carriers to move substantially together in their oscillations about the cross bar 24.

The shock absorber casing 44 is shown as mounted upon the casing 22 which in turn is supported on the vehicle frame, and the casing 44 houses two conventional shock absorbers of the double-acting type, conventional in their cylinder and piston parts, but differing in their control features. The construction is shown in detail in Figs. 4 to 9 inclusive.

In Fig. 7 the inner ends of the shaft parts 42 are shown as extending into the casing 44 and each of these shaft parts has an arm 50 extending downwardly into the cylinder 51 of one of the shock absorbers. In each cylinder is a double-ended piston 52 which has abutments 53 between which the arm 50 extends. Thus the oscillation of the shaft 42, in each case, will slide the piston 52 in the cylinder of the shock absorber. The outer ends of the cylinders are closed by caps 54 and the cylinders are filled with a suitable liquid such as oil. Above the cylinders and connected with the middle portions thereof is a reservoir 55 formed in the casing 44. The inner ends of the shaft parts 42 extend into this reservoir. The piston may be provided with the usual replenishing valve shown diagrammatically at 52', to permit oil to enter the outer ends of the cylinders from the reservoir 55 in order to keep the cylinders full.

At each of the outer ends of the shock absorber cylinders are several ports connected with various passages formed directly in the casing. Amongst these passages are the cross connecting passage means shown particularly in Fig. 6. The upper cylinder shown in Fig. 5 may be referred to as the compression cylinder because it is under compression when the wheel moves upwardly relative to the frame, and the other end of the cylinder may be referred to as the rebound cylinder. Or the ends of the piston 52 may be referred to as the compression side and the rebound side respectively. Thus, the passage 56 from the compression cylinder of the left shock absorber connects through valves 57 and 58 and passage 59 to the rebound cylinder of the right hand shock absorber, and passage 60 from the compression cylinder of the right shock absorber connects through valves 61 and 62 and passage 63 with the rebound cylinder of the left shock absorber. There are also passages 64 and 65 between the valves 57 and 58 and passages 66 and 67 between the valves 61 and 62. The details of these latter passages and the valves are particularly shown in Fig. 6 and it will be seen that the valves may be adjusted either by using shims under the screw heads or by changing the springs behind the valves. Preferably the valves that are opened on the rebound are set with heavier springs though this is not necessarily the case.

With this cross connected passage means it will be seen that a hydraulic connection is established between the adjacent ends of the shaft parts 42 so that as one shaft part is rocked by reason of movement of the wheel carrier to which it is connected, its shock absorber will be operated and the oil passing through the cross connections will operate the other shock absorber to the same extent or it will meet with such resistance that the first shock absorber and wheel carrier cannot be moved as readily as otherwise.

The compression and rebound cylinders or piston sides of each shock absorber are interconnected by two separate passage means, one of them controlled by spring-loaded valves in both directions. Both of these passage means are also controlled by a cut-off valve, and when the cut-off valve is completely closed there is a by-pass around that valve with spring-loaded valves acting as a blow-off for relieving excessive pressures. Since these passages and valves are the same for both shock absorbers a description of one will cover both of them.

Referring particularly to the diagram shown in Fig. 4, and to the sectional views in Figs. 5, 7 and 8, one of these connecting passage means comprises a passage 70 from the compression cylinder, check valves 71 and 72, passages 73 and 74, and a passage 75 into the rebound cylinder. Thus there is a spring-loaded valve for the passage of the fluid in either direction, and one of these valves may be loaded heavier than the other, preferably the rebound valve 71, so that there will be greater resistance to the rebound than to the compression.

The other passage means comprises a passage 76 from the compression cylinder, which passage terminates in a passage 77 into the rebound cylinder. This latter passage is controlled by a valve 78 which may be hand or otherwise operated. An arm 79 is secured to the projecting end of the valve for connection to the desired operating mechanism. The valve 78 also extends through the shock absorber casing and forms a cut-off valve for the connecting passage means of both shock absorbers, but not for the interconnecting passage means between the shock absorbers. This is shown diagrammatically in Fig. 4. In order that this cut-off valve may act first as a "ride control" valve for the individual shock absorbers, its port 80 for the passage 76 is smaller than the ports 81 and 82 for the passages 74 and 73 respectively. Thus we see in Figs. 9, 9a and 9b that the port 80 will first control the restriction of the passage 76 before the ports 81, 82, form any appreciable restriction to the passages 74 and 73. In Fig. 9 the valve 78 is shown in its fully open position, with the port 82 shown in full lines and the port 80 in dotted lines. Since the port 81 is the same size as port 82, it is not shown in these views. In Fig. 9a the valve 78 has been turned to a position just cutting off the passage 76, the dotted line position of the port 80 indicating this. In Fig. 9b the valve 78 has been turned to its fully cut-off position so that all three passages, 76, 74 and 73 are cut off. When the valve is in this position the interconnecting passage means of both shock absorbers is entirely cut off and the shock absorbers then act only through their interconnecting passage means as hereinabove described. But in order to provide against undue strain under these conditions a blow-off valve means is provided around the valve 78. This is particularly shown in Fig. 8 where the passages 83 and 84 with blow-off valves 85 and 86 lead from passages 76 and 77 around the valve 78. The springs of these blow-off valves should preferably be somewhat heavier than those of the valves 71, 72, so that they will come into operation only upon excessive pressure as when the cut-off 78 is entirely closed and one wheel only meets a heavy bump.

From the above it will be seen that all of the passages of the two shock absorbers, including the interconnecting passages, are in a single casting where they may be made free of leakages and free from expansion of tubing under the high pressures involved. Also, with the arrangement of the two interconnected shock absorbers at the middle of the vehicle, the laterally extending shaft parts 42 will act as torsion members and provide just enough resiliency to cure the harshness that might be found in interconnected shock absorbers not equipped with the torsion members.

With the ride control valve 78 the individual shock absorbers may be adjusted for a soft ride or a hard or intermediate ride, depending upon road and speed conditions, and if the anti-roll feature, that is, the cross connection of the shock absorber, is to be used to its greatest extent the control valve 78 may cut off all of the connections between opposite sides of the individual shock absorbers, thus leaving the cross connecting passage means as the sole connections between opposite ends of the shock absorbers except for the blow-off valve.

By forming the two shock absorbers in a single casting and mounting them at the middle of the vehicle, advantageous connections to the wheel carriers may be effected and are availed of in the construction shown.

It will be understood that other forms of individual shock absorbers may be used in lieu of the specific form herein shown, other forms of wheel carriers or axles may be used, other forms of driving mechanism may be employed, and the invention in general may be embodied in various forms other than those described herein without departing from the spirit or scope of the invention.

Having thus described my invention, what I claim and desire to secure by Letters Patent is:

1. In a motor vehicle, the combination with the frame part and the relatively movable wheel carrier part, the latter comprising separated wheel carriers, of means to cause these parts to retain substantial parallelism during movement of the wheel carriers comprising a two-part cross shaft mounted on one of said parts and having remote portions connected to the other of said parts, a hydraulic shock absorber connected to each of the adjacent ends of said shaft parts, and cross connecting conduit means between said shock absorbers.

2. In a motor vehicle, the combination with the frame part and the relatively movable wheel carrier part, the latter including separated wheel carriers, of means to cause these parts to retain substantial parallelism during movement of the wheel carriers comprising a two-part cross shaft mounted on one of said parts and having its remote ends connected to the other of said parts, two shock absorbers mounted in a single casing and each connected to one of the adjacent ends of said shaft parts, and cross connecting conduit means in said casing between the shock absorbers.

3. In shock absorber means, the combination of two double-acting shock absorbers, interconnecting passage means between opposite ends of the shock absorbers, connecting passage means between opposite ends of the same shock absorber, for each shock absorber, a control valve for cutting off the latter connecting passage means, and blow-off valve means between opposite ends of each shock absorber.

4. In a motor vehicle, the combination with the frame and a pair of relatively movable wheel carriers, of shock absorber means comprising two hydraulic shock absorbers housed in a single casing and mounted on the frame, shafts extending laterally from the casing and laterally of the vehicle and connecting the respective shock absorbers to the respective wheel carriers, said casing having entirely within it cross connecting passages between the shock absorbers.

5. In a motor vehicle, the combination with the frame and a pair of relatively movable wheel carriers, of shock absorber means comprising two hydraulic shock absorbers housed in a single casing and mounted on the frame, shafts extending laterally from the casing and laterally of the vehicle and connecting the respective shock absorbers to the respective wheel carriers, and passages between the opposite sides of the respective shock absorbers.

6. In a motor vehicle, the combination of the frame having side members, a wheel carrier pivoted to said frame and having a wheel support at its free end outside of the frame side member and having a part extending inwardly to a point inside the frame side member, a supporting spring between an intermediate portion of said carrier and the frame on one side of a side member, and a shock absorber mounted on the frame and connected to that part of said carrier inside of said side member.

7. In a motor vehicle, the combination with the frame member and the wheel carriers, of a shock absorber means comprising a double-acting shock absorber for each wheel carrier and connected therewith, cross connecting means between said shock absorbers, independent connecting means between opposite sides of each shock absorber, and means for rendering inoperative the latter connecting means in both shock absorbers.

8. In a motor vehicle, the combination with the frame member and the wheel carriers, of a shock absorber means comprising a double-acting shock absorber for each wheel carrier and connected therewith, cross connecting means between said shock absorbers, independent connecting means between opposite sides of each shock absorber, and remote controlled means for rendering inoperative the latter connecting means in both shock absorbers.

9. A hydraulic shock absorber for vehicles comprising a single casing having two double-acting shock absorber pistons therein, independent actuating means for each of said pistons, a cross connecting passage means from the compression side of each piston to the rebound side of the other piston, regulating valves in each of said passage means, connecting passage means from the compression side of each piston to the rebound side of the same piston, control valve means in each of the latter said passage means, additional connecting passage means from the compression side of each piston to the rebound side of the same piston, and valve means for cutting off the connections from opposite sides of the same pistons.

10. In a motor vehicle, the combination with the frame member and the wheel carriers, of a shock absorber means comprising a double-acting shock absorber for each wheel carrier, said shock absorbers mounted on the frame member and connected to the respective wheel carriers, a cross connecting passage means from the compression side of each of said shock absorbers to the rebound side of the other, regulating valves in said passage means, similar connecting passage means and valves from the compression side of each shock absorber to the rebound side of the same shock absorber, and remote controlled valve means in the latter said passage means.

11. In a motor vehicle, the combination with the frame member and the wheel carriers, of a shock absorber means comprising a double-acting shock absorber for each wheel carrier, said shock absorbers mounted on the frame member and connected to the respective wheel carriers, a cross connecting passage means from the compression side of each of said shock absorbers to the rebound side of the other, regulating valves in said passage means, similar but independent connecting passage means and valves from the compression side of each shock absorber to the rebound side of the same shock absorber, and valve means in the latter said passage means adapted in one position to entirely close said passage means.

12. A shock absorber means for vehicles comprising two double-acting shock absorbers, a cross connecting passage means from the compression side of each of said shock absorbers to the rebound side of the other, regulating valves in each of said passage means, a connecting passage means from the compression side of each such shock absorber to the rebound side of the same shock absorber, a control valve in the latter passage means adapted to positively restrict and in one position to entirely close said passage means, and by-pass means around said valve having blow-off valves, one opening in one direction and one in the other.

13. In a motor vehicle, the combination with the frame part and the relatively movable wheel carrier part, the latter comprising separated wheel carriers of means to cause these parts to retain substantial parallelism during movement of the wheel carriers comprising a two-part cross shaft mounted on one of said parts and having remote portions connected to the other of said parts, and hydraulic means at the adjacent ends of said shafts including shock absorber means for each shaft and interconnecting means for the shaft ends.

14. In a motor vehicle, the combination with the frame part and the relatively movable wheel carrier part, the latter comprising separated wheel carriers, of means to cause these parts to retain substantial parallelism during movement of the wheel carriers comprising a two-part cross shaft mounted on one of said parts and having remote portions connected to the other of said parts, a casing into which the adjacent ends of said shafts extend, and hydraulic means within said casing forming a shock absorber for each shaft and an interconnecting means for the shaft ends.

15. In a motor vehicle, the combination with the frame and the wheel carriers, of hydraulic shock absorber means including two parallel cylinders arranged with their axes longitudinally of the vehicle and pistons within the cylinders, torsion shafts extending laterally of the vehicle and having their inner ends connected respectively to the pistons, and means connecting the outer ends of said shafts to the respective wheel carriers.

16. In a motor vehicle, the combination with the frame and the wheel carriers, of hydraulic shock absorber means including two parallel cylinders arranged with their axes longitudinally of the vehicle and pistons within the cylinders, torsion shafts extending laterally of the vehicle and having their inner ends connected respectively to the pistons, means connecting the outer ends of said shafts to the respective wheel carriers and cross connecting passages between the shock absorber cylinders.

17. In a motor vehicle, the combination with the frame having side members and two separated cross members, of a gear casing extending between and mounted upon the cross members, a wheel carrier on either side of the vehicle and pivotally mounted on the frame thereof, shock absorber means mounted on said casing, and connections from said shock absorber means to said wheel carriers.

18. In a motor vehicle, the combination with the frame having side members and two separated cross members, of a gear casing extending between and mounted upon the cross members, a wheel carrier on either side of the vehicle and pivotally mounted on the frame thereof, shock absorber means mounted on said casing, shafts extending laterally from said shock absorber means to adjacent the side members of the frame, arms on said shafts at the outer ends thereof, and connections from said arms to the respective wheel carriers.

19. In a motor vehicle, the combination of a vehicle frame having side members, each of which said side members has an opening therethrough, independently movable wheel carriers pivotally mounted on the frame, each of said wheel carriers having a wheel bearing portion at its free end and having a part extending through the adjacent opening in the frame, a supporting spring between each wheel carrier and the frame, and shock absorber means mounted on the frame and having operating arms connected to the respective wheel carrier parts inside the frame.

20. In a motor vehicle, the combination of a vehicle frame having side members and cross members, a gear casing supported on the frame between the side members thereof, a wheel carrier on either side of the vehicle and pivotally mounted on the frame, said carrier extending rearwardly from its pivotal support, shock absorber means mounted on said gear casing rearwardly of the pivotal supports for said wheel carriers, shaft parts extending laterally from said shock absorber means to adjacent the side members of the frame, arms on said shaft parts at the outer ends thereof, said arms extending rearwardly, and a connection from each of said arms to one of the wheel carriers intermediate the pivotal and wheel-carrying parts thereof.

MILTON TIBBETTS.